United States Patent [19]

Berstein

[11] 4,240,770
[45] Dec. 23, 1980

[54] BORING TOOL WITH A FLOATING KNIFE

[75] Inventor: Garrj Berstein, Erkelenz, Fed. Rep. of Germany

[73] Assignee: W. Hegenscheidt Gesellschaft mbH, Erkelenz, Fed. Rep. of Germany

[21] Appl. No.: 933,138

[22] Filed: Aug. 14, 1978

[51] Int. Cl.³ .............................................. B23B 43/00
[52] U.S. Cl. ...................................... 408/83; 408/82; 408/186; 408/197
[58] Field of Search ................... 408/81, 82, 83, 154, 408/186, 197, 200, 201, 202, 203, 227, 709, 181, 199, 226, 705

[56] References Cited

U.S. PATENT DOCUMENTS

| 2,039,719 | 5/1936 | Kline et al. | 408/83 |
| 2,273,258 | 2/1942 | Groene | 408/83 |
| 2,367,560 | 1/1945 | Boland | 408/181 |
| 2,661,639 | 12/1953 | Clyde | 408/154 |
| 4,130,371 | 12/1978 | Druxeis | 408/154 |

FOREIGN PATENT DOCUMENTS 970669 6/1950 France ........................... 408/199

Primary Examiner—Leonidas Vlachos
Attorney, Agent, or Firm—W. G. Fasse; D. F. Gould

[57] ABSTRACT

A floating knife of a boring tool for machining the inner surfaces of cylinders, has a cutter member and a support element arranged on both sides of the floating knife. The support elements are arranged for cooperation with the respective cutter member. The support elements are arranged behind the cutter member as viewed in the feed advance direction. The support surface of the support element is spaced behind the cutter member in the floating direction of the floating knife by a spacing corresponding to the extent of the allowable yielding of the cutter member in the radial direction, whereby the cutter member is able to machine the inner surface of a cylinder even if the latter has cross-apertures in its wall because the support member limits the radial floating of the knife to a safe extent.

4 Claims, 6 Drawing Figures

BORING TOOL WITH A FLOATING KNIFE

BACKGROUND OF THE INVENTION

The invention relates to a boring tool equipped with a so-called floating knife for machining cylindrical inside surfaces, for example, the cylindrical inner surfaces of hydraulic cylinders.

Basically, boring tools of this type equipped with floating knives are already known through German Utility Model 7,425,824. Also known are combinations of boring tools of this type having knife heads equipped with floating knives and with smoothing roller tools, see for example U.S. Pat. Nos. 3,973,319 and 4,050,976. Tools made according to said U.S. patents have been proven useful in the machining of cylinder bores. Often, however, the problem arises, that the bore of such pneumatic or hydraulic cylinders or similar workpieces is interrupted by apertures running crosswise to the bore axis. Such apertures facilitate the supply and discharge of some type of flowing media or they may be used as access for measuring or control devices. Tools of the type mentioned are incapable of machining the inside surfaces of cylinders interrupted by cross-apertures because the floating knife catches in the crosswise running apertures. Both the tool and the workpiece are thus completely destroyed.

OBJECTS OF THE INVENTION

In view of the foregoing, it is the aim of the invention to achieve the following objects, singly or in combination:

to provide a boring tool with a floating knife which is capable of machining the inner walls of cylinders independently of the presence or absence of apertures in the cylinder wall, especially apertures extending in a direction crosswise to the cylinder axis; and to provide support means for the floating knife which prevent that the latter can follow a radial excursion beyond a predetermined limit.

SUMMARY OF THE INVENTION

According to the invention there is provided a boring tool with a floating knife for the machining of cylindrical inner surfaces with apertures in such inner cylinder surfaces. Support means are arranged behind the floating knife as viewed in the feed advance direction of the floating knife. Further, the support means are set back relative to the cutter means of the floating knife radially inwardly in the floating direction by an extent corresponding to the so-called allowable yielding of the floating knife whereby the extent to which the floating knife may enter into an aperture in the inner cylinder wall, is limited. The support means may be arranged somewhat below the cutter members of the floating knife.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS

Figure 1:
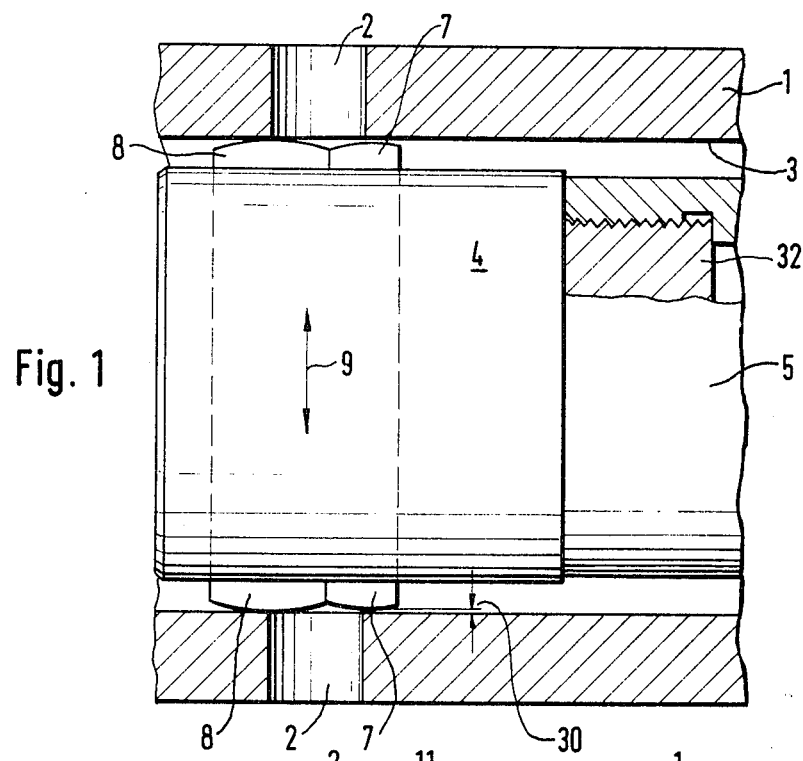
FIG. 1 shows a boring tool equipped with a floating knife engaged in machining a cylinder bore whereby the bore wall is interrupted by two transverse bores located opposite each other.

Referring to FIG. 1, the present boring tool comprises essentially a knife head 4, a threaded shoulder or bushing 32 secured to the knife head 4 and a floating knife 6 inserted in the knife head 4. The bushing 32 is threaded into the forward end of a boring tube 5. The boring tool is supposed to machine the cylindrical inside surface 3 of a cylinder 1, the walls of which are interrupted by two transverse bores 2 situated opposite each other. For this purpose, a cutter 8 is arranged on both sides of the floating knife 6. The cutting edges 10 do the work of cutting the metal.

The floating knife 6 is free to move or "floatable" in the floating direction 9. At least when the tool rotates, the floating knife would, as a result of slight imbalances which can never be eliminated entirely, enter radially in the floating direction 9 into one of the two bores 2 in the area whereby the knife becomes lodged or caught. Thus, the tool and the workpiece could be destroyed. In order to prevent such destruction, a support element 7 is placed behind the cutter 8 of the floating knife 6. The support element 7 is rigidly secured, along with cutter 8, to the floating knife 6. Preferably, the support element 7 has a spherically curved support surface 33 having a radius of curvature, at least in cross section, smaller than the radius of the inner surface 3 of the cylinder to be machined.

The highest point of this support surface 33 which becomes the contact point between the support surface 33 and the inner surface 3 of the cylinder when machining over the transverse bore 2 is set back radially inwardly by the extent 30 of allowable yielding of the cutter 8 relative to the cutting edge 10 of the cutter 8. The just described highest point of the spherically curved support surface 33 is situated axially such that the working area of the cutting edge 10 has moved completely across the respective transverse bore 2 before the highest point dips into the transverse bore. If, during the machining of the transverse bore region, one of the cutters 8 of the floating knife 6 should want to dip into the transverse bore 2, the support surface 33 of the support element 7 would come into contact with the inner surface 3 of the cylinder thereby preventing a further dipping of the cutter 8.

Because of the fact, that the support surface 33 is situated behind the cutting edge 10 of the cutter 8 only to the extent 30 of the allowable yielding, it is assured on the one hand, that the floating knife is unable to yield so far that the given dimensional tolerance of the inside surface 3 of the cylinder would be exceeded. On the other hand, it is assured that the cutting edges 10 of the cutters 8 are subjected to a tolerable wear and tear without the possibility that the floating knife 6 could become jammed by the support elements because the diameter of the inner surface 3 becomes smaller. The support element 7 and the cutter member 8 are positioned in a recess 17 located on each side of the floating knife. The recess 17 is divided by a cross-slot 18, The cross-slot has the effect that each cutter member 8 and each support element 7 may be fastened independently of one another by means of the screws 24 and 25 respectively, which are screwed into tap holes 23 and 23a respectively. A slot 19 provides for the clamping action in the recess 17.

It is not necesary in principle that the highest point of the support surface 33 is placed in the extension of the cutting edge 10. However, this feature is recommended for reasons of an easy adjustability. Usually this cutting edge 10, due to technical metal cutting reasons, it placed slightly beneath a longitudinal sectional plane through the circular center of the bore. As can be seen from FIG. 5, however, this may be quite different. For reasons of wear and tear the support elements 7 as well as 15 are made preferably of hard metal. Hence, it makes sense to position these support elements 7 and 15 respectively on spacers 31 which may be regrindable.

Figure 2:
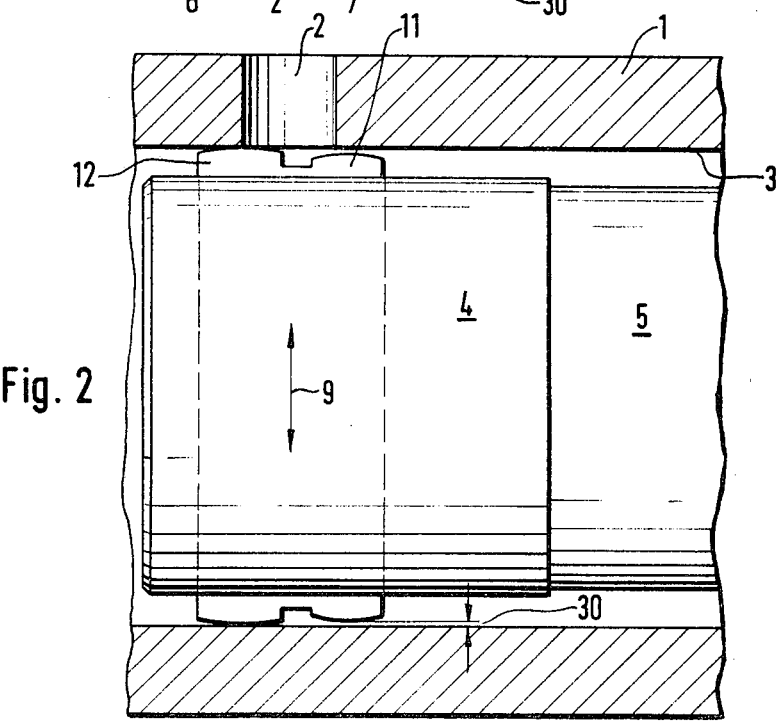
FIG. 2 shows the work situation of FIG. 1, however with only one transverse bore.
Figure 3:
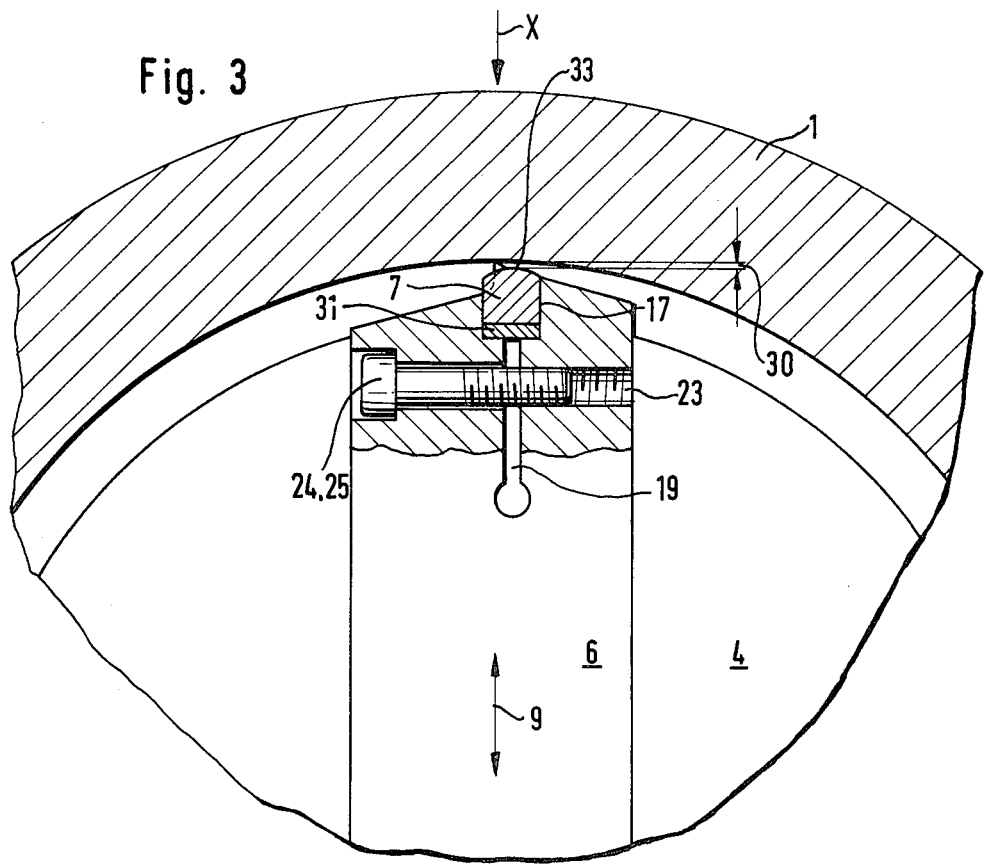
FIG. 3 shows a front view of the tool of FIG. 1.
Figure 4:
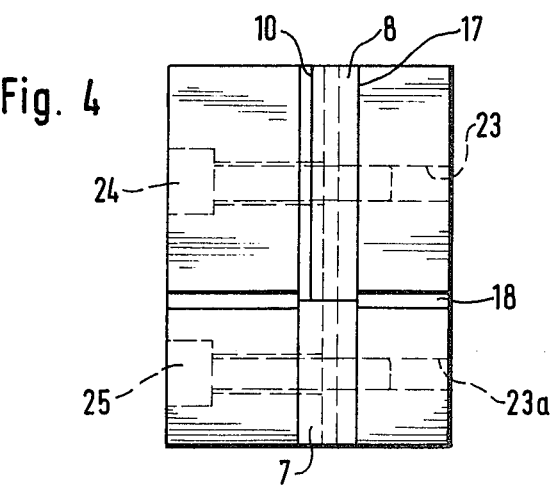
FIG. 4 shows a view of the floating knife of the tool in the direction "x" of FIG. 3.

Since the floating knives 6 and 14 respectively, do not comprise two single pieces adjustable relative to each other, it is advantageous to adjust the cutter members 8 and 16 also by means of regrindable spacers. In a knife head as shown in FIG. 2, the cutter 12 and the support element 11 are one piece, preferably manufactured of hard metal. Thus, the cutter and support element may be exchanged together and the adjustment of the cutter and support element relative to each other is obviated.

Figure 5:
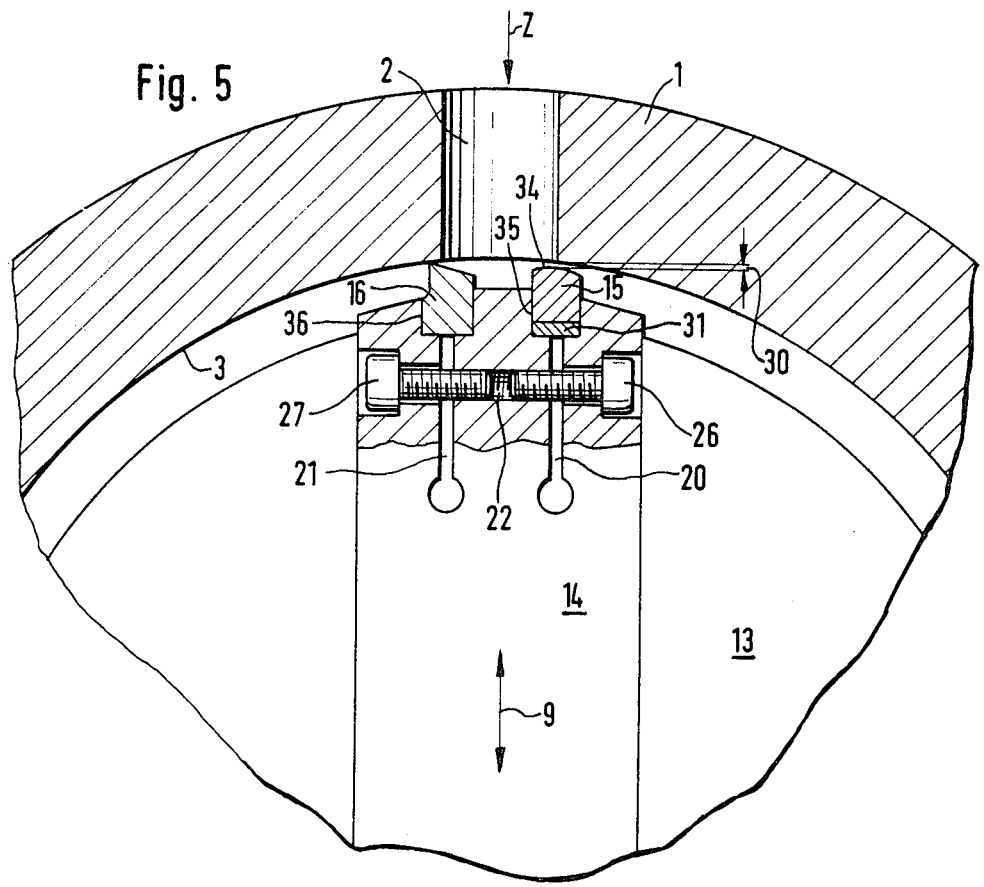
FIG. 5 shows a front view of a boring tool with a floating knife; the front portion of which is situated beneath the cutting portion.
Figure 6:
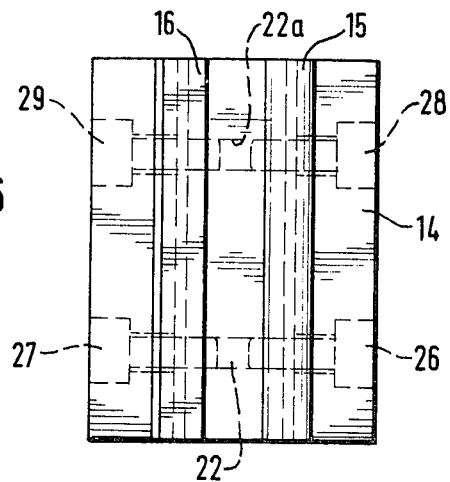
FIG. 6 shows a view of the floating knife of the boring tool of FIG. 5 in the direction "z" shown in FIG. 5.

In a tool as shown in FIG. 5, the cutter member 16 and the support element 15 are placed one below the other. Here, too, the highest point of the support element 15, measured in the direction of floatation 9, is spaced from the inner surface 3 of the cylinder a distance corresponding to the allowable yielding extent 30. The support element 15 and the cutter member 16 are located in the recesses 35 and 36 respectively and may be clamped in position by means of the screws 26, 28, and 27, 29 respectively, which take hold in the threaded holes 22 and 22a.

The slots 20 and 21 provide a means for achieving the clamping action of the cylinders 35 and 36, respectively. Such an arrangement allows for the use of very wide cutters 16 in the floating knife 14 without having to widen the floating knife 14 undesirably as a result of using the support element 15. Wide cutters 16 have the advantage of producing good surfaces in spite of high feed rates.

Although, the invention has been described with reference to specific example embodiments, it will be appreciated that it is intended to cover all modifications and equivalents within the scope of the appended claims.

What is claimed is:

1. A boring tool with knife means for machining inner cylinder surfaces of a workpiece defining an axial direction and a radial direction, said knife means being floatable in said radial direction, said radially floatable knife means comprising cutter means and support means arranged on opposite ends of the floatable knife means, each support means being arranged behind the respective cutter means as viewed in the axial feed advance direction of the boring tool, each support means further being recessed in the radial, floating direction of the boring tool by an extent corresponding to the allowable yielding of the cutter means, whereby said allowable yielding is limited by said support means for permitting said cutter means to pass a hole in said workpiece cylinder surface, and wherein said floatable knife means comprise separate recess means for said cutter means and for said support means, and means clamping said cutter means and said support means in the respective recess means.

2. A boring tool with knife means for machining inner cylinder surfaces of a workpiece defining an axial direction and a radial direction, said knife means being floatable in said radial direction, said radially floating knife means comprising cutter means and support means arranged on opposite ends of the floating knife means, each of said support means being arranged behind the respective cutter means as viewed in the circumferential cutting direction of the boring tool, each support means further being recessed in the radial, floating direction of the boring tool by an extent corresponding to the allowable yielding of the cutter means, whereby said allowable yielding is limited by said support means.

3. The boring tool of claim 2, wherein said floating knife means comprise separate recess means for said cutter means and for said support means, and means clamping said cutter means and said support means in the respective recess means.

4. The boring tool of claim 3, wherein said recess means comprise two substantially parallel slots (20, 21), and wherein said clamping means comprise a threaded hole extending substantially at a right angle relative to said slots and through both slots, said clamping means further comprising threaded bolt means in said threaded hole.

* * * * *